United States Patent
Wang (10) Patent No.: US 11,843,534 B2
(45) Date of Patent: Dec. 12, 2023

(54) STATE DETECTION OF NETCONF SESSION

(71) Applicant: NEW H3C TECHNOLOGIES CO., LTD., Hangzhou (CN)

(72) Inventor: Han Wang, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 135 days.

(21) Appl. No.: 16/609,384

(22) PCT Filed: May 9, 2018

(86) PCT No.: PCT/CN2018/086162
§ 371 (c)(1),
(2) Date: Oct. 29, 2019

(87) PCT Pub. No.: WO2018/214731
PCT Pub. Date: Nov. 29, 2018

(65) Prior Publication Data
US 2020/0067810 A1 Feb. 27, 2020

(30) Foreign Application Priority Data
May 26, 2017 (CN) .......................... 201710383893.6

(51) Int. Cl.
*H04L 43/10* (2022.01)
*H04L 41/0803* (2022.01)
(Continued)

(52) U.S. Cl.
CPC .......... *H04L 43/10* (2013.01); *H04L 41/0803* (2013.01); *H04L 41/0893* (2013.01); *H04L 41/12* (2013.01); *H04L 43/0811* (2013.01)

(58) Field of Classification Search
CPC . H04L 43/10; H04L 41/0803; H04L 41/0893; H04L 41/12; H04L 43/0811; H04L 41/0273
See application file for complete search history.

(56) References Cited

U.S. PATENT DOCUMENTS 9,253,117 B1 * 2/2016 Poutievski .............. H04L 41/12
9,419,874 B2   8/2016 Sun et al.
(Continued)

FOREIGN PATENT DOCUMENTS

CN   103841022   6/2014
CN   104113443   10/2014
(Continued)

OTHER PUBLICATIONS

RFC 6241: Network Configuration Protocol (NETCONF) Jun. 2011, R. Enns , M. Bjorklund, et al. Section 2.2 (Year: 2011).*
(Continued)

*Primary Examiner* — Kibrom T Hailu
*Assistant Examiner* — Robert Ma
(74) *Attorney, Agent, or Firm* — NORTON ROSE FULBRIGHT US LLP (57) ABSTRACT

A method and device for detecting a NETCONF session state are provided. According to an example of the method, detection of a NETCONF connection is caused by a change of an OpenFlow connection. In the case that a NETCONF session is established between a controller and a switching device, when detecting that an OpenFlow connection between the controller and the switching device changes in state, the controller sends a packet for obtaining session information of the NETCONF session to the switching device. The NETCONF session is determined to be abnormal if no session information is obtained within a preset time period; and the NETCONF session is determined to be normal if the session information is obtained within the preset time period.

11 Claims, 5 Drawing Sheets

(51) Int. Cl.
*H04L 41/0893* (2022.01)
*H04L 41/12* (2022.01)
*H04L 43/0811* (2022.01)

(56) References Cited

U.S. PATENT DOCUMENTS

| | | | |
|---|---|---|---|
| 2014/0298052 A1 | 10/2014 | Meirosu et al. | |
| 2015/0215156 A1* | 7/2015 | Yoon | H04L 41/0668 370/225 |
| 2015/0304205 A1* | 10/2015 | Yuan | H04L 45/026 370/392 |
| 2016/0373300 A1* | 12/2016 | Liu | H04L 41/0806 |
| 2017/0048084 A1 | 2/2017 | Sigoure et al. | |
| 2017/0339134 A1* | 11/2017 | Han | H04L 49/70 |

FOREIGN PATENT DOCUMENTS

| | | | |
|---|---|---|---|
| CN | 104580293 | | 4/2015 |
| CN | 105591804 | | 5/2016 |
| EP | 3070895 | | 9/2016 |
| JP | 2008148017 | | 6/2008 |
| JP | 2008263393 | | 10/2008 |
| KR | 101586151 | B1 * | 1/2016 |

OTHER PUBLICATIONS

Office Action issued in Corresponding Japanese Application No. 2020-514315, dated Nov. 4, 2020 (English Translation provided).
"OpenFlow Management and Configuration Protocol (OF-Config 1.1.1)" *Open Networking Foundation* Mar. 23, 2013, 5-17.
International Search Report and Written Opinion Issued in Chinese International Application No. PCT/CN2018/086162, dated Jul. 23, 2018 (English Translation of ISR).
Malishevskiy et al., "OpenFlow-based Network Management with Visualization of Managed Elements" *Sandhya Narayan and Stuart Bailey Infoblox Inc.*, 2 pages.
Nan, "Design and Implementation of Gateway App in SDN Controller" A Thesis Submitted to Southeast University 2015, 73 pages (English Abstract only).
"OpenFlow Switch Specification—Version 1.5.1 (Protocol version 0X06)" *Open Networking Foundation* 2015, 284 pages.
Bansal et al., "OpenFlow Management and Configuration Protocol (OF-Config 1.1.1)" *Open Networking Foundation* 2013, 174 pages.
Extended European Search Report issued in corresponding European application No. 18805699.8, dated Feb. 24, 2020.
Notification to Grant Patent Right for Invention issued in corresponding Chinese application No. 201710383893.6, dated Mar. 6, 2020, 5 pages (English machine translation provided).

* cited by examiner

STATE DETECTION OF NETCONF SESSION

CROSS REFERENCE TO RELATED APPLICATIONS

This application is a national phase under 35 U.S.C. § 371 of International Application No. PCT/CN2018/086162, filed May 9, 2018, which claims priority to Chinese Patent Application No. 201710383893.6 entitled "METHOD AND DEVICE FOR DETECTING NETCONF SESSION STATE" filed on May 26, 2017, the entire contents of each of which are incorporated herein by reference.

BACKGROUND

The present disclosure relates to detecting Network Configuration (NETCONF) session state.

NETCONF is a configuration protocol based on an eXtensible Markup Language (XML). After a NETCONF session is established between a controller and a switching device, the controller may send a NETCONF message to the switching device based on the NETCONF session to perform network configuration for the switching device. In this way, the workload of a network administrator to perform configuration can be simplified and more flexible and convenient network configuration can be achieved.

DETAILED DESCRIPTION OF THE EMBODIMENTS

NETCONF is a configuration protocol based on an eXtensible Markup Language (XML). After a NETCONF session is established between a controller and a switching device, the controller may send a NETCONF message to the switching device based on the NETCONF session to perform network configuration for the switching device, which simplifies configuration operation of a network administrator and realizes more flexible and convenient network configuration. However, the NETCONF session between the controller and the switching device may become abnormal for reasons such as a link failure, a switching device failure and the like, and therefore the controller cannot send a network configuration to the switching device.

For a NETCONF protocol, a short connection manner of Hyper Text Transfer Protocol over Secure Socket Layer (HTTPS) may be utilized. For example, Simple Object Access Protocol (SOAP) over HTTPS, a short connection manner based on the HTTPS, may be chosen for the NETCONF. Moreover, a keep-alive mechanism may be achieved for the NETCONF connection in the SOAP over HTTPS manner by means of periodic heartbeat detection, which is hereinafter referred to as periodic heartbeat detection.

The periodic heartbeat detection may specifically include the following processes. A controller may obtain NETCONF session information in a fixed time period from a switching device using an authentication token obtained when the NETCONF session is established. If the NETCONF session information is obtained successfully, the NETCONF session between the controller and the switching device is deemed as normal and the switching device is determined to be in an active state. If the NETCONF session information has not been obtained successfully, and the NETCONF session information has continuously failed to be obtained for N times (the value of N is, for example, 3) until now, the NETCONF session between the controller and the switching device may be deemed as abnormal and the switching device may be determined to be in an inactive state. The controller may send a network configuration to the switching device after determining that the switching device is in the active state, or may prohibit send a network configuration to the switching device after determining that the switching device is in the inactive state.

When a controller manages a small number of switching devices, the above-mentioned manner that the controller periodically obtains NETCONF session information from a switching device may have a good adaptability and provide reliable device connectivity information.

However, with an increasing number of switching devices managed by the controller, the manner of periodically obtaining NETCONF session information from the switching devices will result in increasingly higher overhead and performance pressure, which may even affect normal operation. The reason is as follows. NETCONF session information is periodically obtained from a switching device in the SOAP over HTTPS manner, and therefore an HTTPS connection is to be established between the controller and the switching device before the NETCONF session information is obtained from the switching device each time. Frequent establishment of HTTPS connections may cause operating system port numbers of the controller to be used up soon and thus none port number can be distributed subsequently.

To solve the above problem, the present disclosure provides a method of detecting a NETCONF session state, which may achieve NETCONF session detection by means of OpenFlow. OpenFlow is a communication interface standard between a controller and a forwarding layer defined in a Software Defined Network (SDN) architecture. OpenFlow allows a controller to directly access and operate forwarding planes of switching devices. Such switching devices may be physical or virtual. The idea of OpenFlow is separating a control plane and a data plane, where forwarding is performed in a flow manner on the data plane and communication is performed between the data plane and the control plane based on a standard protocol.

The method of detecting a NETCONF session state by means of OpenFlow provided in the present disclosure will be described below.

Figure 1:
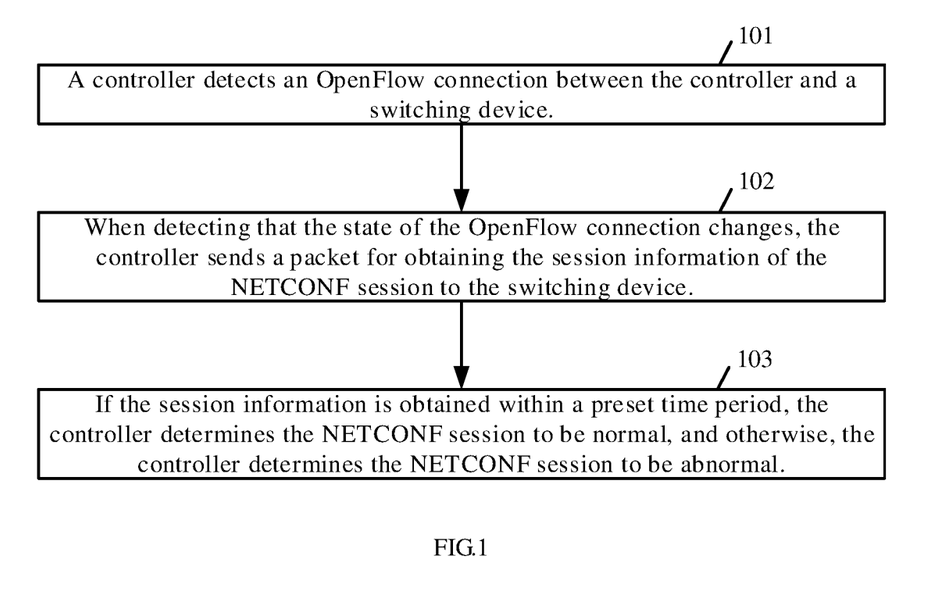
FIG. 1 is a schematic flowchart illustrating a method of detecting a NETCONF session state according to an example of the present disclosure.

FIG. 1 is a schematic flowchart illustrating a method of detecting a NETCONF session state according to an example of the present disclosure. As shown in FIG. 1, the method may be applied to a controller, where a NETCONF session is established between the controller and a switching device. In an example, the NETCONF session between the controller and the switching device may be established in a connection manner defined by a NETCONF protocol, and the establishing process may generally include the following processes. The controller (serving as a NETCONF client) may send a hello packet of the NETCONF protocol to the switching device (serving as a NETCONF server), where the hello packet carries a user name and a password. The switching device may authenticate the user name and the password carried in the hello packet after receiving the hello packet. If the authentication is successful, a NETCONF session between the controller and the switching device is established successfully, and the switching device may return an authentication token to the controller. Subsequently, any packet of the NETCONF protocol sent by the controller to the switching device may carry the authentication token to indicate the identity of the controller. On the contrary, if the authentication fails, the controller will periodically resend the hello packet of the NETCONF protocol to the switching device to request establishing a NETCONF session.

As shown in FIG. 1, the method of detecting a NETCONF session state according to an example of the present disclosure may include the following blocks.

At block 101, a controller may detect an OpenFlow connection between the controller and a switching device.

In an example, the OpenFlow connection in the block 101 may be established in the following manner. The controller sends a NETCONF message to the switching device, where the NETCONF message carries an OpenFlow configuration. The switching device may initiate an OpenFlow connection request to the controller using the OpenFlow configuration. Then, the controller may receive the OpenFlow connection request initiated by the switching device and establish an OpenFlow connection with the switching device based on the OpenFlow connection request. In an example, the OpenFlow configuration may include an IP address of the controller and the like.

In the example, there may be a plurality of NETCONF sessions established between the controller and the switching device, but session state detection may be performed for only one NETCONF session. The NETCONF session as described in block 102 to block 103 refers to the NETCONF session for which a session state is detected. When the NETCONF session is determined abnormal, all the plurality of NETCONF sessions established between the controller and the switching device may be considered abnormal, where the NETCONF session and the OpenFlow connection are carried on a same physical link.

In an example, the controller may detect the OpenFlow connection between the controller and the switching device by heartbeat keep-alive mechanism based on TCP, the heartbeat keep-alive mechanism being provided by the OpenFlow protocol. The heartbeat keep-alive mechanism based on TCP may be deemed to be a heartbeat keep-alive mechanism based on a long connection. The heartbeat keep-alive mechanism based on TCP may directly exchange data without establishing an HTTPS connection, thus effectively saving performance overhead, compared with the periodic heartbeat detection in SOAP over HTTPS manner, which is based on a short connection.

Figure 1A:
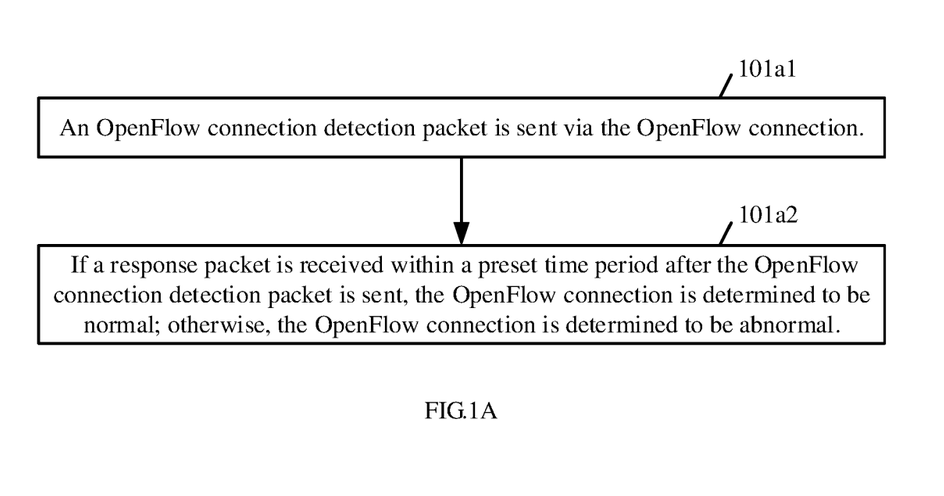
FIG. 1A is a schematic flowchart illustrating detecting a state of an OpenFlow connection between a controller and a switching device according to the method shown in FIG. 1.

Specifically, as shown in FIG. 1A, detecting the OpenFlow connection between the controller and the switching device as mentioned above by the heartbeat keep-alive mechanism based on TCP may include the following blocks.

At block 101a1, an OpenFlow connection detection packet is sent via the OpenFlow connection.

In an example, the OpenFlow connection detection packet may be an echo request packet of the OpenFlow protocol.

At block 101a2, if a response packet corresponding to the OpenFlow connection detection packet is received within a preset time period after the OpenFlow connection detection packet is sent, the OpenFlow connection is determined to be normal; otherwise, the OpenFlow connection is determined to be abnormal.

In an example, if the OpenFlow connection detection packet is the echo request packet of the OpenFlow protocol, the corresponding response packet is an echo reply packet.

When the OpenFlow connection is determined to be normal at block 101a2, if the OpenFlow connection has been recorded abnormal previously, it means that the state of the OpenFlow connection changes from the abnormal state to the normal state. Change from the abnormal state to the normal state of the OpenFlow connection may be recorded as an OpenFlow connection activation (DATAPATH_CONNECT) event.

When the OpenFlow connection is determined to be abnormal at block 101a2, if the OpenFlow connection is recorded normal previously, it means that the OpenFlow connection changes from the normal state to the abnormal state. Change of the OpenFlow connection from the normal state to the abnormal state may be recorded as an OpenFlow connection disconnect (DATAPATH_DISCONNECT) event.

At block 102, when detecting that the state of the OpenFlow connection changes, the controller may send a packet for obtaining session information of the NETCONF session to the switching device.

In an example, at block 102, processes of sending by the controller a packet for obtaining the session information of the NETCONF session to the switching device may specifically include: the controller may send a packet for obtaining the session information of the NETCONF session to the switching device in the SOAP over HTTPS manner, so that the session information of the NETCONF session is obtained.

Figure 1B:
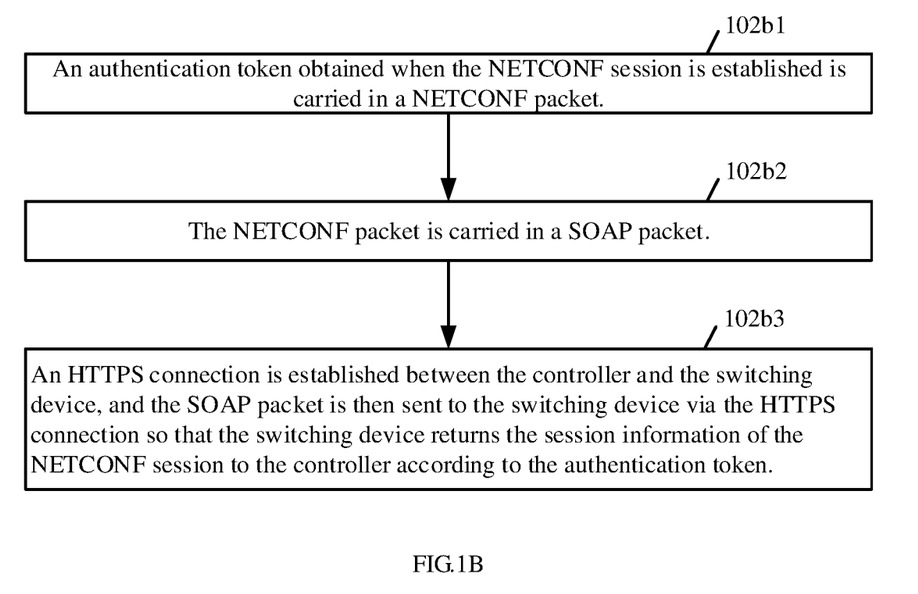
FIG. 1B is a schematic flowchart illustrating sending a packet to a switching device to obtain NETCONF session information in a SOAP-over-HTTPS manner according to the method shown in FIG. 1.

In an example, as shown in FIG. 1B, processes of sending by the controller a packet for obtaining the session information of the NETCONF session to the switching device in the SOAP over HTTPS manner as described above may specifically include the following blocks.

At block 102b1, the authentication token obtained when the NETCONF session is established may be carried in a NETCONF packet.

In an example, the NETCONF packet here may be a get-sessions message of the NETCONF protocol. The get-sessions message may be used to determine whether the NETCONF session is normal. The reason for selecting get-sessions messages is that get-sessions messages generally have less content than other messages of the NETCONF protocol. However, a person skilled in the art may also select other messages of the NETCONF protocol according to actual needs.

At block 102b2, the NETCONF packet may be carried in a SOAP packet.

At block 102b3, an HTTPS connection may be established between the controller and the switching device, and the SOAP packet may be sent to the switching device via the HTTPS connection, so that the switching device returns the session information of the NETCONF session to the controller according to the authentication token.

The NETCONF packet may be sent to the switching device in the SOAP over HTTPS manner through the block 102b1 to the block 102b3 as described above.

As can be seen from the above descriptions of block 101 and block 102, sending a packet for obtaining the session information of the NETCONF session to the switching device in the SOAP over HTTPS manner may be triggered by the change of the state of the OpenFlow connection, that is to say, detection of the NETCONF session state may be caused by a change of the OpenFlow connection. Moreover, as described above, the OpenFlow connection is a long connection, and the heartbeat keep-alive mechanism based on the change of the state of the OpenFlow connection may directly exchange data without establishing a connection, thus effectively saving performance overhead, compared with the periodic heartbeat detection in SOAP over HTTPS manner, which is based on a short connection.

At block 103, if no session information is obtained within a preset time period, the controller may determine the NETCONF session being abnormal; and if the session information is obtained within the preset time period, the controller may determine the NETCONF session being normal.

Thus, the flow shown in FIG. 1 is completed.

In an example, when the NETCONF session is determined to be abnormal, the switching device may be further determined to be in an inactive state.

In an example, if the OpenFlow connection changes from the abnormal state to the normal state and the NETCONF session is determined to be normal, the switching device may be determined to be in an active state.

In an example, if the OpenFlow connection changes from the normal state to the abnormal state and the NETCONF session is determined to be normal, the switching device may be determined to be in the inactive state. Under normal circumstances, the states of the OpenFlow connection and the NETCONF session between the switching device and the controller are generally consistent. The switching device may default to be in the inactive state in a case where states of the OpenFlow connection and the NETCONF session are inconsistent so as to prevent wrong configurations. Therefore, in this example, although the NETCONF session is determined to be normal, since the Openflow connection is abnormal, i.e., the states of the Openflow connection and the NETCONF session between the switching device and the controller are inconsistent, the switching device may be determined to be in the inactive state.

As described above, under normal circumstances, the states of the OpenFlow connection and the NETCONF session between the switching device and the controller are generally consistent. When the states of the OpenFlow connection and the NETCONF session are inconsistent, for example, when the OpenFlow connection changes from the abnormal state to the normal state and the NETCONF session is determined to be abnormal, or when the OpenFlow connection changes from the normal state to the abnormal state and the NETCONF session is determined to be normal, the NETCONF session may be closed to cause the NETCONF session to be reestablished, so as to try to make the states of the OpenFlow connection and the NETCONF session consistent.

An OpenFlow connection anomaly may be a physical link anomaly, or an anomaly of an end device of the OpenFlow connection, which is not specifically defined herein. The physical link here may host the OpenFlow connection and the NETCONF session for NETCONF session state detection.

In an example, when the switching device is determined to be in the inactive state, a network configuration may be prohibited from being sent to the switching device.

In an example, when the switching device is determined to be in the active state, a network configuration may be sent to the switching device.

The flow shown in FIG. 1 will be described below with a specific example.

Figure 2:
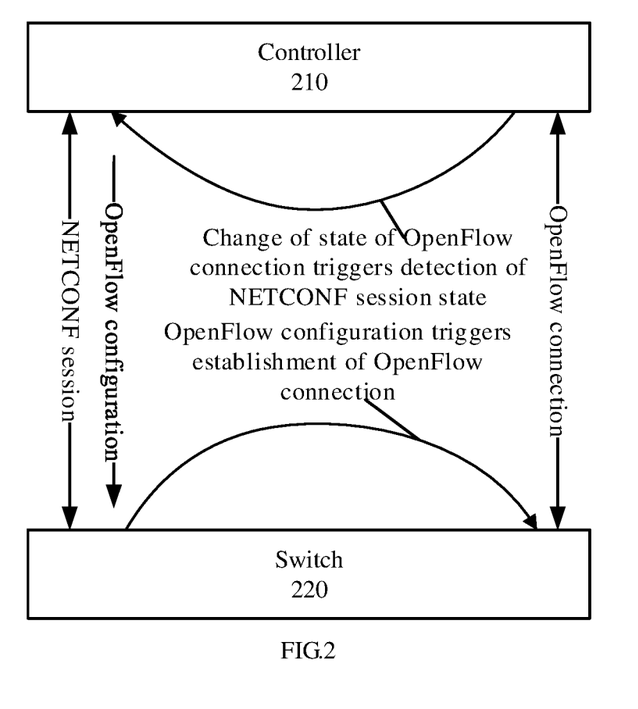
FIG. 2 is a schematic diagram illustrating an application network for the method shown in FIG. 1.

FIG. 2 is a schematic diagram illustrating an application network for the method shown in FIG. 1 according to an example of the present disclosure. The network shown in FIG. 2 may include a controller 210 and a switch 220. The controller 210 and the switch 220 both support OpenFlow. The controller 210 may be configured to control and manage the switch 220. FIG. 2 illustrates an example with one switch 220 only.

As shown in FIG. 2, the controller 210 may, as a NETCONF client, send a hello packet of a NETCONF protocol to the switch 220 (serving as a NETCONF server), where the hello packet carries a user name and a password.

After receiving the hello packet, the switch 220 may authenticate the user name and the password carried in the hello packet. If the authentication is successful, it means that a NETCONF session between the controller 210 and the switch 220 has been established successfully, and the switch 220 may return an authentication token to the controller 210.

The controller 210 may receive and save the authentication token returned by the switch 220 and send a NETCONF message carrying an OpenFlow configuration to the switch 220.

The switch 220 may locally establish an OpenFlow instance based on the OpenFlow configuration in the received NETCONF message and send a hello packet of an OpenFlow protocol to the controller 210 according to an IP address of the controller 210 carried in the OpenFlow configuration. The hello packet sent by the switch 220 may carry an OpenFlow protocol version supported by the switch 220.

When the controller 210 receives the hello packet from the switch 220, if the OpenFlow protocol version supported by the controller 210 matches (is identical to or compatible with) the Openflow protocol version that is supported by the switch 220 and carried in the hello packet it means that the OpenFlow protocol versions supported by the controller 210 and the switch 220 are successfully negotiated. In this case, the OpenFlow connection between the controller 210 and the switch 220 may be established successfully and may operate normally.

When the OpenFlow connection between the controller 210 and the switch 220 is established successfully and operates normally, the controller 210 may determine that the OpenFlow connection between the controller 210 and the switch 220 changes from an unused state to a normally used state.

After the OpenFlow connection is established successfully between the controller 210 and the switch 220, the OpenFlow connection between the controller 210 and the switch 220 may be detected by using the heartbeat keep-alive mechanism based on TCP, which will be specifically described as follows.

The controller 210 may send an echo request packet of the OpenFlow protocol to the switch 220 via the OpenFlow connection established with the switch 220 in the first period for the OpenFlow connection detecting. After receiving the echo request packet, the switch 220 may return an echo reply packet to the controller 210 via the OpenFlow connection established with the controller 210. If the controller 210 receives the echo reply packet returned by the switch 220 in a preset time period, the controller 210 may determine that the OpenFlow connection between the controller 210 and the switch 220 is normal. In this case, since establishing the OpenFlow connection previously implies that the OpenFlow connection is normal, it may be determined that the OpenFlow connection between the controller 210 and the switch 220 is maintained as normal, that is, there is no change in state.

Figure 4:
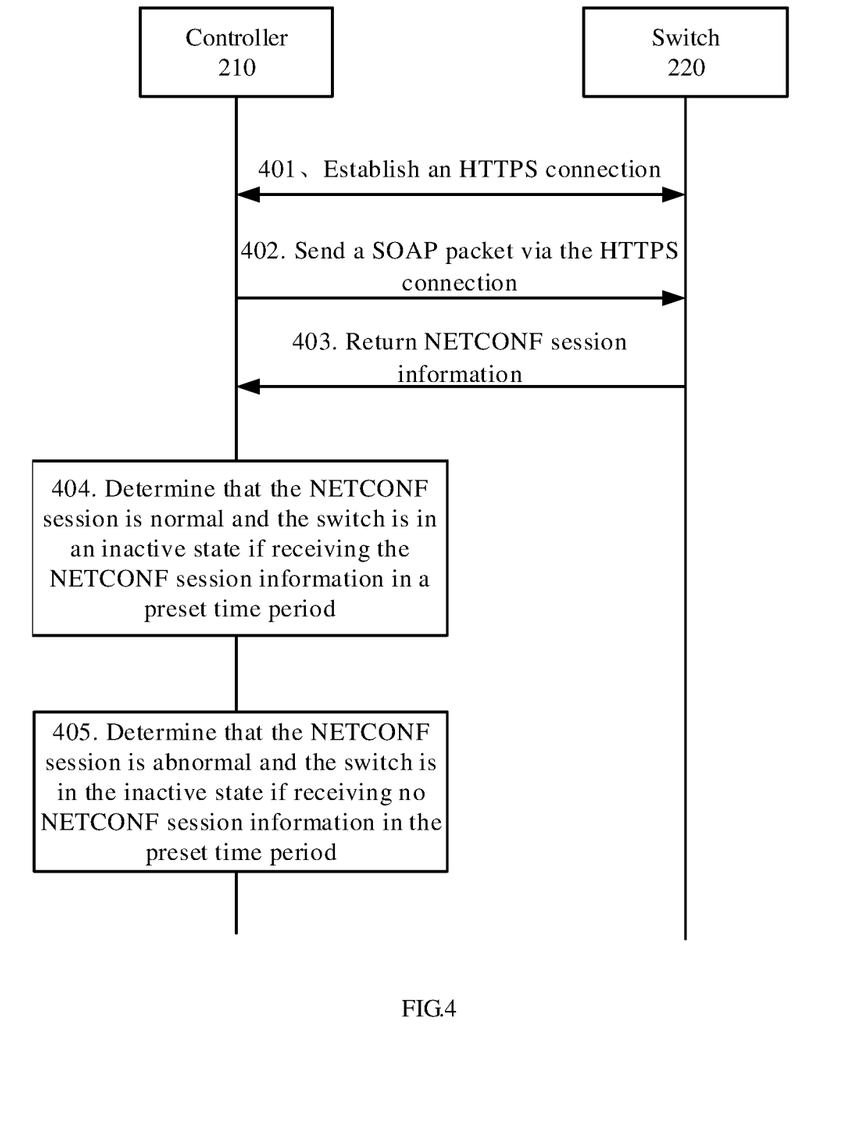
FIG. 4 is a schematic diagram illustrating a second flowchart according to an example of the present disclosure.

On the contrary, if the controller 210 has not received echo reply packet returned from the switch 220 in the preset time period in the first period for the OpenFlow connection detecting, the controller 210 may determine that the OpenFlow connection between the controller 210 and the switch 220 is abnormal. In this case, since establishing the OpenFlow connection previously implies that the OpenFlow connection is normal, if the controller 210 determines that the OpenFlow connection between the controller 210 and the switch 220 is abnormal at this time, it may be equivalent to that the controller 210 determines that the OpenFlow connection between the controller 210 and the switch 220 changes from the normal state to the abnormal state; then, the following flow as shown in FIG. 4 may be performed by the controller 210.

In a non-first period for the OpenFlow connection detecting, the controller 210 may send an echo request packet of the OpenFlow protocol to the switch 220 via the OpenFlow connection established with the switch 220. After receiving the echo request packet, the switch 220 may return an echo reply packet to the controller 210 via the OpenFlow connection established with the controller 210. If the controller 210 receives the echo reply packet returned by the switch 220 in the preset time period, the controller 210 may determine that the OpenFlow connection between the controller 210 and the switch 220 is normal. In this case, if it is detected that the OpenFlow connection between the controller 210 and the switch 220 is normal in the previous period for the OpenFlow connection detecting, the controller 210 may determine that the OpenFlow connection between the controller 210 and the switch 220 is maintained as normal, that is, there is no change in state. However, if it is detected that the OpenFlow connection between the controller 210 and the switch 220 is abnormal in the previous period for the OpenFlow connection detecting, the controller 210 may determine that the OpenFlow connection between the controller 210 and the switch 220 changes from the abnormal state to the normal state at this time.

On the contrary, in the non-first period for the OpenFlow connection detecting, if the controller 210 has not received echo reply packet returned from the switch 220 in the preset time period, the controller 210 may determine that the OpenFlow connection between the controller 210 and the switch 220 is abnormal. In this case, if it is detected that the OpenFlow connection between the controller 210 and the switch 220 is abnormal in the previous period for the OpenFlow connection detecting, the controller 210 may determine that the OpenFlow connection between the controller 210 and the switch 220 is maintained as abnormal, that is, there is no change in state. However, if it is detected that the OpenFlow connection between the controller 210 and the switch 220 is normal in the previous period for the OpenFlow connection detecting, the controller 210 may determine that the OpenFlow connection between the controller 210 and the switch 220 changes from the normal state to the abnormal state at this time.

Figure 3:
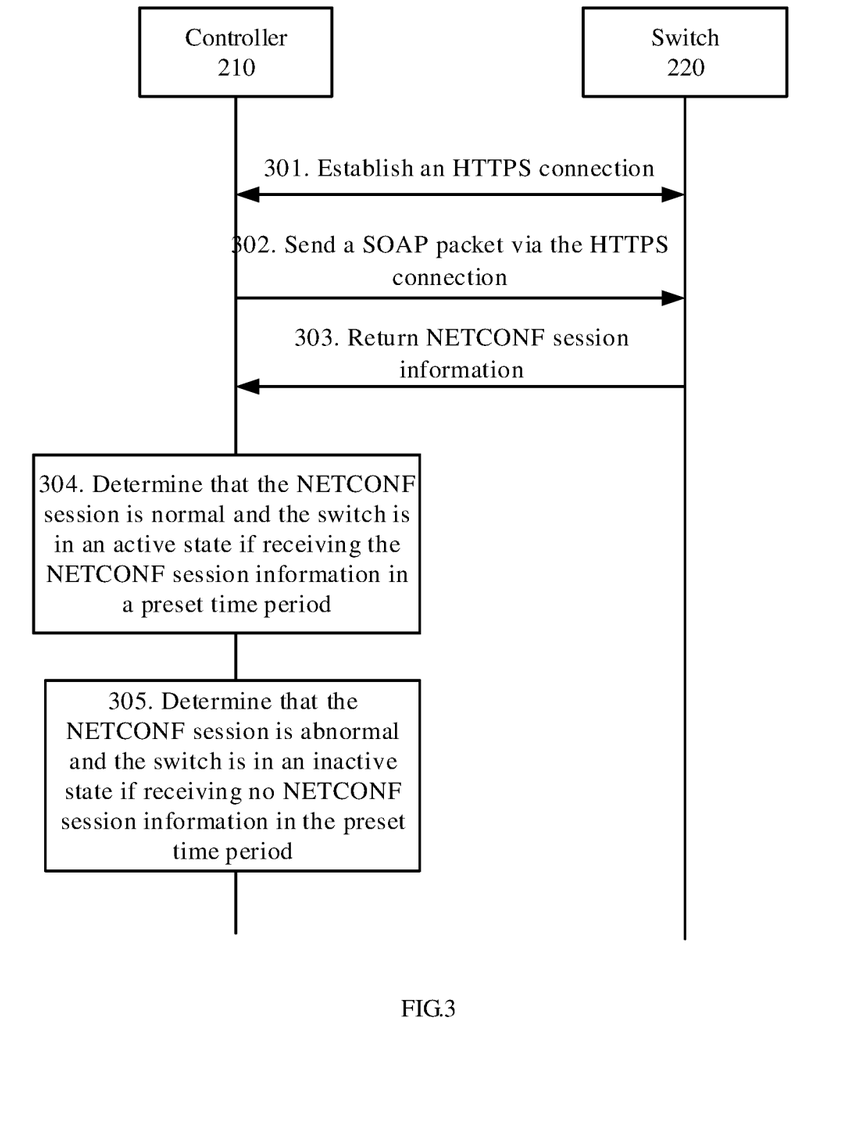
FIG. 3 is a schematic diagram illustrating a first flowchart according to an example of the present disclosure.

When the controller 210 determines that the OpenFlow connection between the controller 210 and the switch 220 changes from the abnormal state to the normal state, the flow as illustrated in FIG. 3 below may be performed. When the controller 210 determines that the OpenFlow connection between the controller 210 and the switch 220 changes from the normal state to the abnormal state, the flow as illustrated in FIG. 4 below may be performed.

The flow illustrated in FIG. 3 may be performed when the controller 210 determines that the OpenFlow connection between the controller 210 and the switch 220 changes from the abnormal state to the normal state, which may specifically include the blocks as follows.

At block 301, an HTTPS connection may be established between the controller 210 and the switch 220.

At block 302, the controller 210 may carry the stored authentication token, which is obtained when NETCONF session is established, in a get-sessions message of the NETCONF protocol and send a SOAP packet with the get-sessions message as a BODY element via the HTTPS connection.

At block 303, the switch 220 may authenticate the authentication token carried in the get-sessions message in the SOAP packet after receiving the SOAP packet. If the authentication is successful, the switch 220 may return NETCONF session information indicating that NETCONF session between the switch 220 and the controller 210 is currently normal to the controller 210 via the above HTTPS connection.

In an example, at the above block 303, processes of returning the NETCONF session information indicating that the NETCONF session between the switch 220 and the controller 210 is currently normal to the controller via the HTTPS connection may specifically include: the switch 220 may carry the NETCONF session information in a response (rpc-reply) message of the NETCONF protocol and send a SOAP packet with the rpc-reply message as the BODY element to the controller 210 via the HTTPS connection.

However, the specific content of the NETCONF session information returned to the controller 210 is not limited herein and may be set by a person skilled in the art according to an actual requirement.

At block 304, the controller 210 may determine that the NETCONF session between the controller 210 and the switch 220 is normal if the NETCONF session information returned by the switch 220 is received in a preset time period. In this case, the switch 220 may be determined to be in the active state.

At block 305, the controller 210 may determine that the NETCONF session between the controller 210 and the switch 220 is abnormal if no NETCONF session information returned by the switch 220 is received in the preset time period. In this case, the switch 220 may be determined to be in the inactive state.

As described above, the flow shown in FIG. 3 may be performed when the OpenFlow connection changes from the abnormal state to the normal state. Thus, at block 305, when the controller 210 determines that the NETCONF session between the controller 210 and the switch 220 is abnormal, it means that the states of the OpenFlow connection and the NETCONF session between the controller 210 and the switch 220 are inconsistent. In the case of the inconsistency as described above, the NETCONF session may be closed to cause the NETCONF session to be re-established.

Thus, the flow shown in FIG. 3 is completed.

The flow shown in FIG. 4 may be performed when the controller 210 determines that the OpenFlow connection between the controller 210 and the switch 220 changes from the normal state to the abnormal state, which may specifically include the following blocks.

At block 401, an HTTPS connection may be established between the controller 210 and the switch 220.

At block 402, the controller 210 may carry the stored authentication token, which is obtained when the NETCONF session is established, in a get-sessions message of the NETCONF protocol and send a SOAP packet with the get-sessions message as BODY element via the HTTPS connection.

At block 403, the switch 220 may authenticate the authentication token carried in the get-sessions message in the SOAP packet after receiving the SOAP packet. If the authentication is successful, the switch 220 may return NETCONF session information indicating that NETCONF session between the switch 220 and the controller 210 is currently normal to the controller 210 via the above HTTPS connection.

In an example, at the above block 403, processes of returning the NETCONF session information indicating that the NETCONF session between the switch 220 and the controller 210 is currently normal to the controller 210 via the HTTPS connection may specifically include: the switch 220 may carry the NETCONF session information in an Rpc-reply message of the NETCONF protocol and send SOAP packet with the Rpc-reply message as the BODY element to the controller 210 via the HTTPS connection.

In the present disclosure, the specific content of the NETCONF session information returned to the controller 210 is not limited herein and may be set by a person skilled in the art according to an actual requirement.

At block 404, the controller 210 may determine that the NETCONF session between the controller 210 and the switch 220 is normal if the NETCONF session information returned by the switch 220 is received in a preset time period. In this case, the switch 220 may be determined to be in the inactive state.

At block 405, the controller 210 may determine that the NETCONF session between the controller 210 and the switch 220 is abnormal if no NETCONF session information returned by the switch 220 is received in the preset time period. In this case, the switch 220 may be determined to be in the inactive state.

Since the flow illustrated in FIG. 4 may be performed when the OpenFlow connection changes from the normal state to the abnormal state, thus, at block 404, when the controller 210 determines that the NETCONF session between the controller 210 and the switch 220 is normal, it means that the states of the OpenFlow connection and the NETCONF session between the controller 210 and the switch 220 are inconsistent. In the case of the inconsistency as described above, the NETCONF session may be closed to perform an operation of re-establishing a NETCONF session.

As described above, the flow illustrated in FIG. 4 may be performed when the OpenFlow connection changes from the normal state to the abnormal state. Thus, at block 405, when the controller 210 determines that the NETCONF session between the controller 210 and the switch 220 is abnormal, it means that the states of the OpenFlow connection and the NETCONF session between the controller 210 and the switch 220 are consistent. In the case of consistency, the OpenFlow connection may be detected continuously, and the above flow illustrated in FIG. 3 may be performed when it is detected that the OpenFlow connection changes from the abnormal state to the normal state.

Thus, the flow shown in FIG. 4 is completed.

Figure 5:
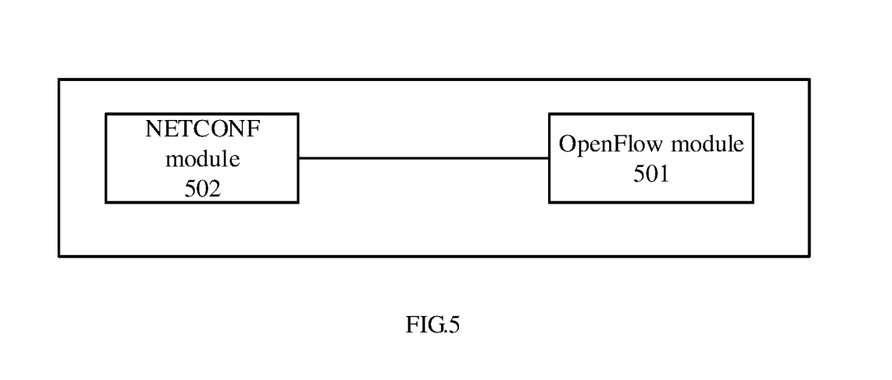
FIG. 5 is a schematic diagram illustrating a structure of a device according to an example of the present disclosure.

FIG. 5 is a schematic diagram illustrating a structure of a device according to an example of the present disclosure. The device may be applied to a controller that supports OpenFlow. When the device is applied to the controller, a NETCONF session may be established between the controller and a switching device. As shown in FIG. 5, the device may include an OpenFlow module 501 and a NETCONF module 502.

The OpenFlow module 501 may be configured to detect an OpenFlow connection between the controller and the switching device and send a notification to the NETCONF module 502 when detecting that the OpenFlow connection changes in state.

The NETCONF module 502 may be configured to send a packet for obtaining session information of the NETCONF session to the switching device in response to the notification received from the OpenFlow module 501. If no session information is obtained within a preset time period, the NETCONF module 502 may determine that the NETCONF session is abnormal. If the session information is obtained within the preset time period, the NETCONF module 502 may determine that the NETCONF session is normal.

In an example, the NETCONF module 502 may be configured to determine that the switching device is in an inactive state when determining that the NETCONF session is abnormal.

In an example, the NETCONF module 502 may be configured to determine that the switching device is in an active state when the OpenFlow connection changes from an abnormal state to a normal state and the NETCONF session is determined to be normal; and determine that the switching device is in the inactive state when the OpenFlow connection changes from the normal state to the abnormal state and the NETCONF session is determined to be normal.

In an example, the NETCONF module 502 may be configured to close the NETCONF session to cause the NETCONF session to be re-established when the OpenFlow connection changes from the abnormal state to the normal state and the NETCONF session is determined to be abnormal, or when the OpenFlow connection changes from the normal state to the abnormal state and the NETCONF session is determined to be normal.

In an example, processes of sending by the NETCONF module 502 a packet for obtaining the session information of the NETCONF session to the switching device may specifically include: NETCONF module 502 may carry an authentication token, which is obtained when the NETCONF session is established, in a NETCONF packet, and carry the NETCONF packet in a SOAP packet; establish an HTTPS connection between the controller and the switching device, and send the SOAP packet to the switching device via the HTTPS connection, so that the switching device may return the session information of the NETCONF session to the controller according to the authentication token.

Thus, the description of the device illustrated in FIG. 5 is completed.

Figure 6:
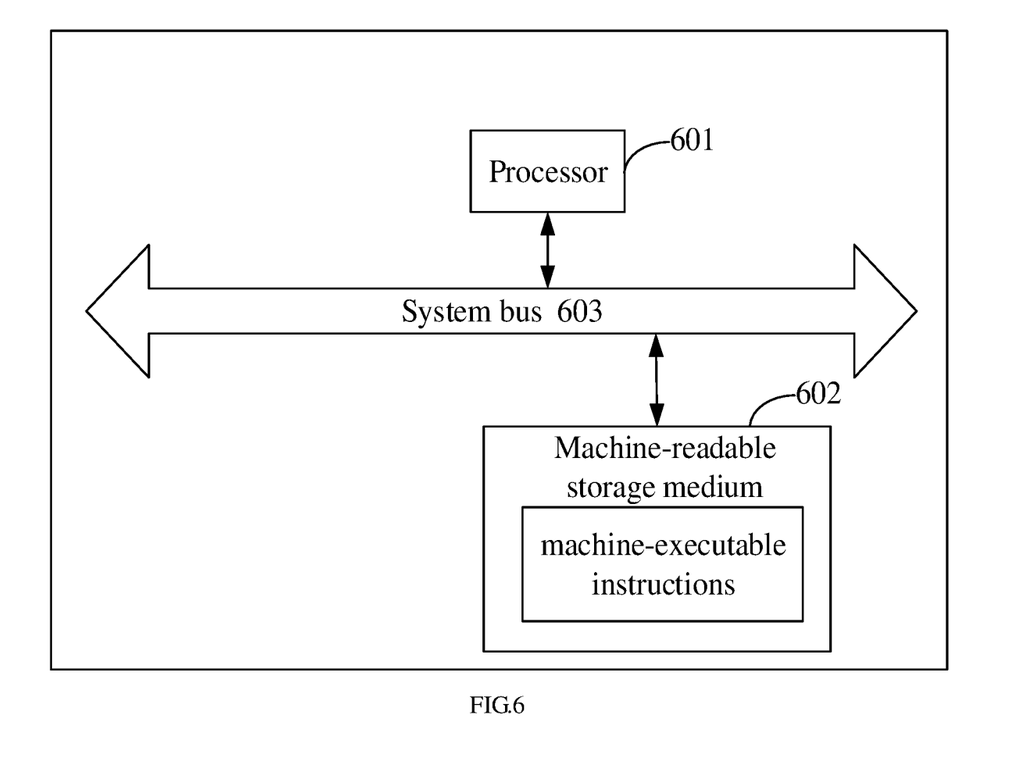
FIG. 6 is a schematic diagram illustrating a hardware structure of a device according to an example of the present disclosure.

Correspondingly, the present disclosure also provides a hardware structure diagram of the device as illustrated in FIG. 5. As shown in FIG. 6, the hardware structure may include a processor 601, and a machine-readable storage medium 602 that stores machine-executable instructions. The processor 601 may communicate with the machine-readable storage medium 602 via a system bus 603. Also, by reading and executing the machine-executable instructions corresponding to logic of detecting a NETCONF session state and stored on the machine-readable storage medium 602, the processor 601 may execute the method of detecting a NETCONF session state as described above.

The machine-readable storage medium 602 mentioned herein may be any electronic, magnetic, optical or other physical storage device, and may contain or store information, such as executable instructions, data and the like. For example, the machine-readable storage medium may be a Random Access Memory (RAM), a volatile memory, a nonvolatile memory, a flash memory, a storage drive (e.g., hard disk drive), a solid state disk, any type of storage disk (e.g., optical disk, Digital Video Disk (DVD)), or a similar storage medium, or a combination thereof.

Thus, the description of the hardware structure illustrated in FIG. 6 is completed.

In the present disclosure, a machine-readable storage medium including machine-executable instructions is also provided, for example, the machine-readable storage medium 602 in FIG. 6. The machine-executable instructions may be executed by the processor 601 in the device for detecting a NETCONF session state so as to implement the method of detecting a NETCONF session state as described above.

Specifically, by invoking and executing the machine-executable instructions corresponding to the logic of detecting a NETCONF session state and stored in the machine-readable storage medium, the processor 601 may perform operations in the method of detecting a NETCONF session state as described above.

The foregoing are merely descriptions of examples of the present disclosure and not intended to limit the present disclosure. Any modifications, equivalent substitutions, adaptations and the like made within the spirit and the principles of the present disclosure shall be encompassed in the claimed scope of the present disclosure.

The invention claimed is:

1. A method of detecting Network Configuration (NETCONF) session state, comprising:
   detecting, by a controller, an OpenFlow connection between the controller and a switching device, wherein a NETCONF session is established between the controller and the switching device;
   sending, by the controller, which is triggered by detecting that a state of the OpenFlow connection changes, a packet for obtaining session information of the NETCONF session to the switching device;
   determining, by the controller, that the NETCONF session is abnormal when no session information is obtained within a preset time period;
   determining, by the controller, that the NETCONF session is normal when the session information is obtained within the preset time period;
   determining, by the controller, that the switching device is in an inactive state in response to that both of the following conditions are met: i) detecting that the OpenFlow connection changes from a normal state to an abnormal state and ii) determining that the NETCONF session is normal; and
   determining, by the controller, that the switching device is in an inactive state in response to that both of the following conditions are met: iii) detecting that the OpenFlow connection changes from an abnormal state to a normal state and iv) determining that the NETCONF session is abnormal;
   in response to that the switching device is in an inactive state, the controller prohibits sending a network configuration to the switching device;
   closing, by the controller, the NETCONF session in response to that both of the following conditions are met: i) detecting that the OpenFlow connection changes from a normal state to an abnormal state and ii) determining that the NETCONF session is normal;
   closing, by the controller, the NETCONF session in response to that both of the following conditions are met: iii) detecting that the OpenFlow connection changes from an abnormal state to a normal state and iv) determining that the NETCONF session is abnormal.

2. The method according to claim 1, further comprising:
   determining, by the controller, that the switching device is in an inactive state when determining that the NETCONF session is abnormal.

3. The method according to claim 1, further comprising:
   determining, by the controller, that the switching device is in an active state when detecting that the OpenFlow connection changes from an abnormal state to a normal state and determining that the NETCONF session is normal.

4. The method according to claim 1, further comprising:
   closing, by the controller, the NETCONF session when detecting that the OpenFlow connection changes from an abnormal state to a normal state and determining that the NETCONF session is abnormal.

5. The method according to claim 1, wherein sending the packet for obtaining the session information of the NETCONF session to the switching device comprises:
   carrying, by the controller, an authentication token, which is obtained when the NETCONF session is established, in a NETCONF packet;
   carrying, by the controller, the NETCONF packet in a Simple Object Access Protocol (SOAP) packet;
   establishing, by the controller, an HTTPS connection between the controller and the switching device; and
   sending, by the controller, the SOAP packet to the switching device via the HTTPS connection.

6. A device for detecting Network Configuration (NETCONF) session state, the device being applied to a controller and comprising:
   a processor; and
   a non-transitory machine-readable storage medium that stores machine-executable instructions,
   wherein by executing the machine-executable instructions, the processor is caused to:
   detect an OpenFlow connection between the controller and a switching device, wherein a NETCONF session is established between the controller and the switching device;
   send, which is triggered by detecting that a state of the OpenFlow connection changes, a packet for obtaining session information of the NETCONF session to the switching device;
   determine that the NETCONF session is abnormal when no session information is obtained within a preset time period;
   determine that the NETCONF session is normal when the session information is obtained within the preset time period;
   determine that the switching device is in an inactive state in response to that both of the following conditions are met: i) detecting that the OpenFlow connection changes from a normal state to an abnormal state and ii) determining that the NETCONF session is normal; and determining that the switching device is in an inactive state in response to that both of the following conditions are met: iii) detecting that the OpenFlow connection changes from an abnormal state to a normal state and iv) determining that the NETCONF session is abnormal;

in response to that the switching device is in an inactive state, prohibit sending a network configuration to the switching device;

closing the NETCONF session in response to that both of the following conditions are met: i) detecting that the OpenFlow connection changes from a normal state to an abnormal state and ii) determining that the NETCONF session is normal;

closing the NETCONF session in response to that both of the following conditions are met: iii) detecting that the OpenFlow connection changes from an abnormal state to a normal state and iv) determining that the NETCONF session is abnormal.

7. The device according to claim 6, wherein the machine-executable instructions further cause the processor to:

determine that the switching device is in an inactive state when determining that the NETCONF session is abnormal.

8. The device according to claim 6, wherein the machine-executable instructions further cause the processor to:

determine that the switching device is in an active state when detecting that the OpenFlow connection changes from an abnormal state to a normal state and determining that the NETCONF session is normal.

9. The device according to claim 6, wherein the machine-executable instructions further cause the processor to:

close the NETCONF session when detecting that the OpenFlow connection changes from an abnormal state to a normal state and determining that the NETCONF session is abnormal.

10. The device according to claim 6, wherein when sending the packet for obtaining the session information of the NETCONF session to the switching device, the processor is caused by the machine executable instructions to:

carry an authentication token, which is obtained when the NETCONF session is established, in a NETCONF packet;

carry the NETCONF packet in a Simple Object Access Protocol (SOAP) packet;

establish an HTTPS connection between the controller and the switching device; and send the SOAP packet to the switching device via the HTTPS connection.

11. A non-transitory machine-readable storage medium that stores machine-executable instructions, wherein a controller is caused by executing the machine-executable instructions to:

detect an OpenFlow connection between the controller and a switching device, wherein a NETCONF session is established between the controller and the switching device;

send, which is triggered by detecting that a state of the OpenFlow connection changes, a packet for obtaining session information of the NETCONF session to the switching device;

determine that the NETCONF session is abnormal when no session information is obtained within a preset time period;

determine that the NETCONF session is normal when the session information is obtained within the preset time period;

determine that the switching device is in an inactive state in response to that both of the following conditions are met: i) detecting that the OpenFlow connection changes from a normal state to an abnormal state and ii) determining that the NETCONF session is normal; and determining that the switching device is in an inactive state in response to that both of the following conditions are met: iii) detecting that the OpenFlow connection changes from an abnormal state to a normal state and iv) determining that the NETCONF session is abnormal;

in response to that the switching device is in an inactive state, prohibit sending a network configuration to the switching device;

closing the NETCONF session in response to that both of the following conditions are met: i) detecting that the OpenFlow connection changes from a normal state to an abnormal state and ii) determining that the NETCONF session is normal;

closing the NETCONF session in response to that both of the following conditions are met: iii) detecting that the OpenFlow connection changes from an abnormal state to a normal state and iv) determining that the NETCONF session is abnormal.

* * * * *